United States Patent
Gee

(10) Patent No.: US 8,720,384 B2
(45) Date of Patent: May 13, 2014

(54) DOG WALKING APPARATUS

(71) Applicant: Raggio & Dinnin, P.C., Auburn Hills, MI (US)

(72) Inventor: Mary Yvonne Gee, West Bloomfield, MI (US)

( * ) Notice: Subject to any disclaimer, the term of this patent is extended or adjusted under 35 U.S.C. 154(b) by 0 days.

(21) Appl. No.: 13/680,212

(22) Filed: Nov. 19, 2012

(65) Prior Publication Data

US 2013/0125834 A1  May 23, 2013

Related U.S. Application Data

(60) Provisional application No. 61/629,667, filed on Nov. 23, 2011.

(51) Int. Cl.
*A01K 23/00* (2006.01)
*A01K 27/00* (2006.01)

(52) U.S. Cl.
USPC .............................. 119/795; 119/867; 294/1.3

(58) Field of Classification Search
USPC ........... 119/795, 796, 797, 798, 867; 294/1.3, 294/1.4, 1.5
See application file for complete search history.

(56) References Cited

U.S. PATENT DOCUMENTS

| | | | | |
|---|---|---|---|---|
| 2,732,935 A * | 1/1956 | Gui | ............................. | 206/449 |
| 4,151,910 A * | 5/1979 | Yasur | ........................... | 206/216 |
| 4,706,845 A * | 11/1987 | Schnurer et al. | .............. | 221/102 |
| 5,441,017 A * | 8/1995 | Lindsay | ....................... | 119/795 |
| 5,490,623 A * | 2/1996 | McConnell | .................... | 224/275 |
| 5,551,569 A * | 9/1996 | Garvin-Mazzarisi | ......... | 206/554 |
| 5,890,456 A * | 4/1999 | Tancrede | ...................... | 119/794 |
| 6,085,695 A * | 7/2000 | Miller et al. | ................... | 119/795 |
| 6,170,692 B1 * | 1/2001 | Johnston | ...................... | 220/475 |
| 6,240,881 B1 * | 6/2001 | Edwards et al. | ............... | 119/795 |
| 6,439,386 B1 * | 8/2002 | Sauer et al. | ................... | 206/494 |
| 6,508,383 B2 * | 1/2003 | Lidahl et al. | .................... | 221/97 |
| 6,588,375 B2 * | 7/2003 | Benedettini | .................. | 119/795 |
| 6,647,923 B2 * | 11/2003 | Nicoud et al. | ................ | 119/161 |
| 6,702,147 B2 * | 3/2004 | Ashford | ........................ | 221/34 |
| 7,194,982 B2 * | 3/2007 | Edwards | ....................... | 119/796 |
| 7,810,860 B2 * | 10/2010 | Bell | ................................ | 294/1.3 |
| 8,312,599 B2 * | 11/2012 | Vogl et al. | ...................... | 24/3.12 |
| 2005/0263087 A1 * | 12/2005 | Livingston | .................... | 119/161 |
| 2006/0231043 A1 * | 10/2006 | Galdo | ........................... | 119/796 |
| 2007/0045333 A1 * | 3/2007 | Mitchell et al. | ................. | 221/34 |
| 2007/0241123 A1 * | 10/2007 | Che | ................................. | 221/64 |
| 2007/0251466 A1 * | 11/2007 | Bell | ............................... | 119/867 |
| 2007/0267531 A1 * | 11/2007 | Petersen | .................... | 242/588.6 |
| 2008/0185854 A1 * | 8/2008 | Bell | ............................... | 294/1.3 |
| 2009/0267370 A1 * | 10/2009 | Bell | ............................... | 294/1.3 |
| 2012/0286003 A1 * | 11/2012 | Shadday et al. | ............. | 224/191 |

* cited by examiner

*Primary Examiner* — Yvonne Abbott
(74) *Attorney, Agent, or Firm* — Raggio & Dinnin, P.C.

(57) ABSTRACT

A dog walking tube comprising a hollow tube having a first end and a second end. The hollow tube has a portion that will hold fecal matter waste bags. The opposite or second end of the hollow container receives and stores used fecal matter waste bags. The dog walking tube may allow used and new fecal mater waste bags to be held within the dog walking tube and not the dog walkers hand during the walk.

18 Claims, 3 Drawing Sheets

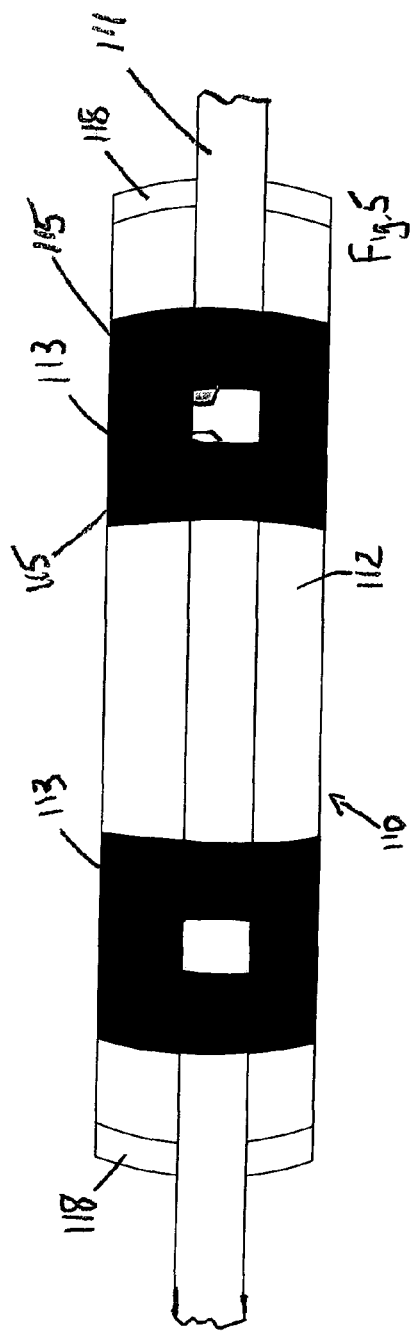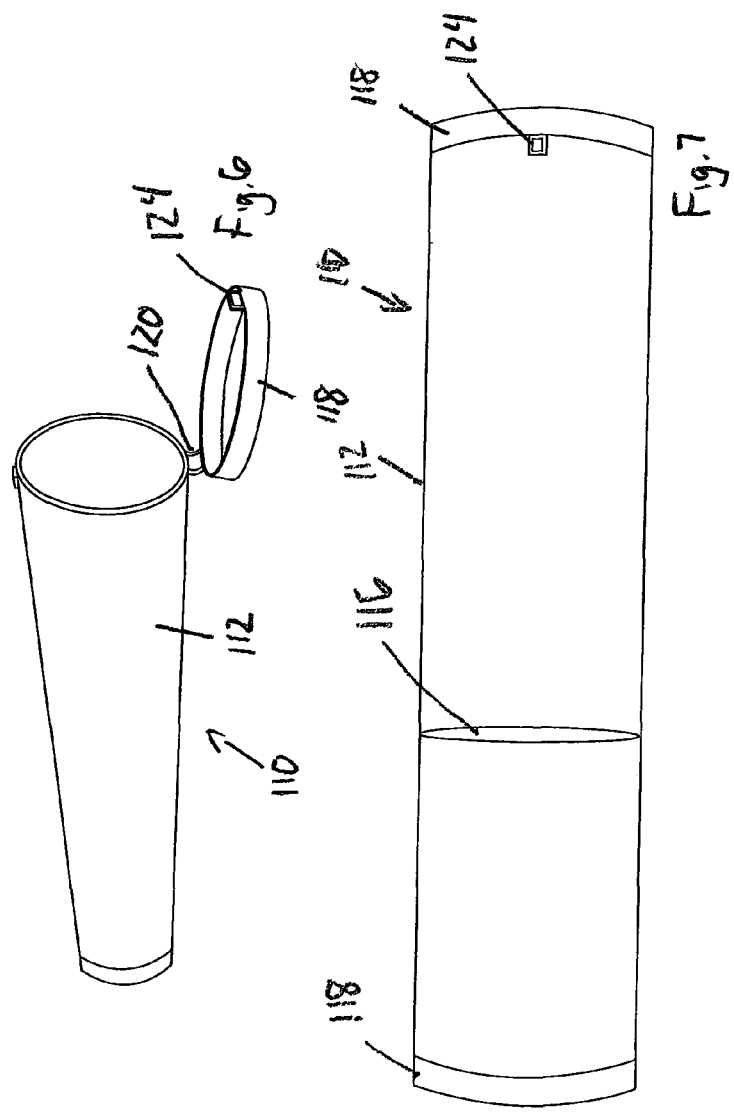

DOG WALKING APPARATUS

This application claims the benefit of U.S. Provisional Patent Application 61/629,667 file Nov. 23, 2001

BACKGROUND OF THE INVENTION

1. Field of the Invention

The present invention generally relates to dog walking apparatuses and accessories, and more particularly relates to a dog walking tube or cane that includes a first end that has a compartment for storing dog fecal matter waste bags and at another other end of the tube a storage area for storing the used dog fecal matter waste bags during the walk of a pet.

2. Description of Related Art

Pet accessories for dogs, cats and other animals are all well known in the art. Many accessories are available for pets that allow an owner of the pet to walk the pet and have other enjoyment with the pet during ownership thereof. Many of these pet accessories include things such as dog bowls, dog leashes, collars, jackets and all other types of pet accessories. It should be noted that many municipalities now require dog owners to pick up after their dogs in public areas so as not to leave fecal matter on public land. It is also known many people carry bags or devices in order to pick up and properly dispose of the fecal matter from the pet during walks of the animal. Many people who use bags to pick up the fecal matter of dogs on walks generally pick up the fecal matter from the grass or surrounding area and tie a knot in the bag and them carry the bag in their open hand while the leashed animal is in the other hand. This carrying of the fecal matter in a bag is unpleasant and unsightly to many owners of animals.

There have been many attempts in the prior art to develop baggies, gloves and other containers for picking up animal fecal matter during walks of the animals in public and private areas. Some of these prior art fecal matter storage devices are as simple as disposable plastic bags, disposable plastic gloves and/or a battery operated walking stick that uses an auger to pick up and remove animal fecal matter from the ground in a public or private area.

However, there is a need in the art for an apparatus that can store the unsightly plastic or other type of bags that hold the fecal matter out of sight from the public while the dog walker is finishing the walk of their animal. There also is a need in the art for a convenient dispenser of the plastic or fecal matter bags on the same apparatus, which also has the storage area for the used fecal matter bags. There also is a need in the art for a walking cane that can be used as both a dog fecal matter bag dispenser and a dog fecal matter used bag storage container to hide the already used fecal matter bags from public viewing during the walk of the animal. There also is a need in the art for a dog walking tube or cane that may also be used as a self defense mechanism against criminals or other animals during the dog walk by the owner. Furthermore, there is a need in the art for either a plastic, metal, ceramic, or composite tube that is capable of storing both fecal matter dog bags and storing used fecal matter dog bags from public view during the walk of the animal.

SUMMARY OF THE INVENTION

One object of the present invention may be to provide an improved dog walking tube or cane.

Another object of the present invention may be to provide a dog walking tube or cane that is capable of dispensing dog fecal matter waste bags.

Still another object of the present invention may be to provide a dog walking tube that is capable of storing used fecal matter waste bags from public view during a walk of the animal.

Another object of the present invention may be to provide a dog walking tube having a hook or eyelet attached to one end of the tube to secure a small bottle of hand sanitizer or the like.

Another object of the present invention may be to provide a dog walking tube or cane that includes hand grips around the tube to more ergonomically fit the hand of the user.

Still another object of the present invention may be to provide the dog walking tube that has a storage compartment arranged on one end of the tube that holds a used fecal matter bag during the walk of the animal.

Another object of the present invention may be to provide a dog walking tube that is also capable of being used as a defense mechanism that can ward off and fight off any potential danger from other humans or other animals.

Still another object of the present invention may be to provide a dog walking cane that is available in a variety of colors and textures.

According to the present invention, the foregoing and other objects and advantages are obtained by a novel design for a dog walking tube or cane. The dog walking tube or cane includes a hollow tube having a first end and a second end. On the first end of the hollow tube is arranged a container that holds a plurality of fecal matter waste bags for use during walking or exercising of the animal. The opposite or second end of the dog walking tube or cane includes a hollow container that may be used to receive and store the used fecal matter waste bags. This may allow the fecal matter waste bags to be stored within the dog walking tube and not in the dog walker's hand during the walk. It should be noted that each end of the dog walking tube includes a lid and/or latch which pivots around a predetermined pivot point and locks to the body of the container on each end of the tube. Any known locking mechanism may secure the latch to the body of the container. It is also contemplated to have an interior separation wall that may separate the first container area of the dog walking tube and the second area of the dog walking tube to ensure that the unused fecal matter waste bags are not contaminated by the used fecal matter waste bags stored on the opposite end of the dog walking tube. It is also contemplated to have a preformed hand grip formed around each end of the container such that either end of the container may be held in the hand of the animal walker. It is also contemplated to have a wrist band attached to at least one end of the dog walking tube on an outside surface of the container. Furthermore, it is contemplated to have a hook or eyelet member secured to an outside surface of the lid in order to attach a small bottle of hand sanitizer or the like to the dog walking tube. It should be noted that the cane may be of any known length and any known width and may also include various colors or designs on the outer surface to personalize the dog walking tube or cane to the user.

One advantage of the present invention may be that it provides for an improved dog walking tube.

A further advantage of the present invention may be that it provides for an improved dog walking tube that is capable of storing animal fecal matter waste bags in one end thereof.

Still a further advantage of the present invention may be that it provides for a dog walking tube that is capable of storing used fecal matter waste bags in one end of the tube.

Still another advantage of the present invention may be that it provides a dog walking tube that has an eyelet attached on one end thereof in order to attach a small bottle of hand sanitizer or the like.

Still another advantage of the present invention may be that it provides for a dog walking tube that has hand grips arranged around the outer surface of the tube on each end thereof for an ergonomical fit to the hand of the user.

Yet another advantage of the present invention may be that it provides for a dog walking tube that has pivotable lids attached to each end thereof to secure the fecal matter waste bags on one end thereof and the used fecal matter waste bags on the opposite end thereof.

Still another advantage of the present invention may be that it provides for a dog walking tube that includes a wrist band attached to an outer surface thereof to allow for ease of use of the dog walking tube.

Yet another advantage of the present invention may be that it provides for a dog walking tube that is available in various colors and various themes, textures, or designs arranged on the outside thereof.

Other objects, features and advantages of the present invention may become apparent from the subsequent description and appended claims, taken in conjunction with the accompanying drawings.

BRIEF DESCRIPTION OF THE DRAWINGS

FIG. 5 shows a plan view of an alternate embodiment of a dog walking tube and leash according to the present invention.

FIG. 6 shows an end view of an alternate embodiment of a dog walking tube according to the present invention.

FIG. 7 shows a cross sectional view of the dog walking tube according to an alternate embodiment of the present invention.

Figure 1:
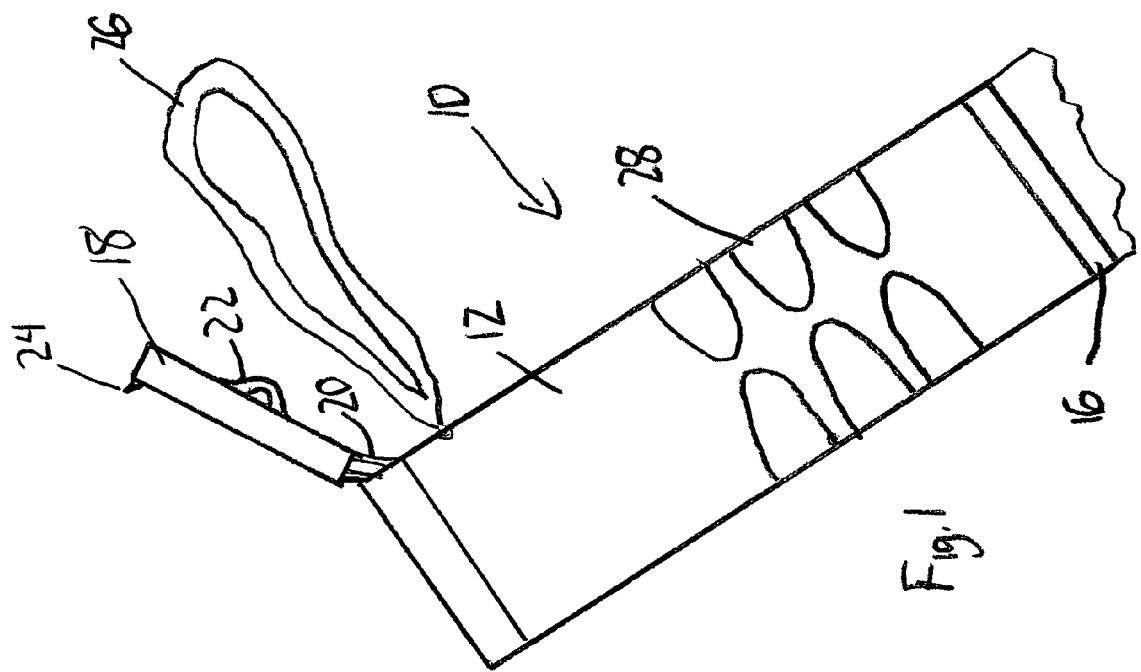
FIG. 1 shows a plan view of one end of a dog walking tube according to the present invention.
Figure 2:
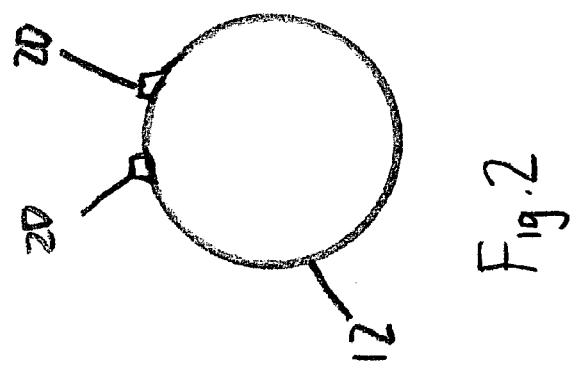
FIG. 2 shows an end view of the dog walking tube according to the present invention.
Figure 3:
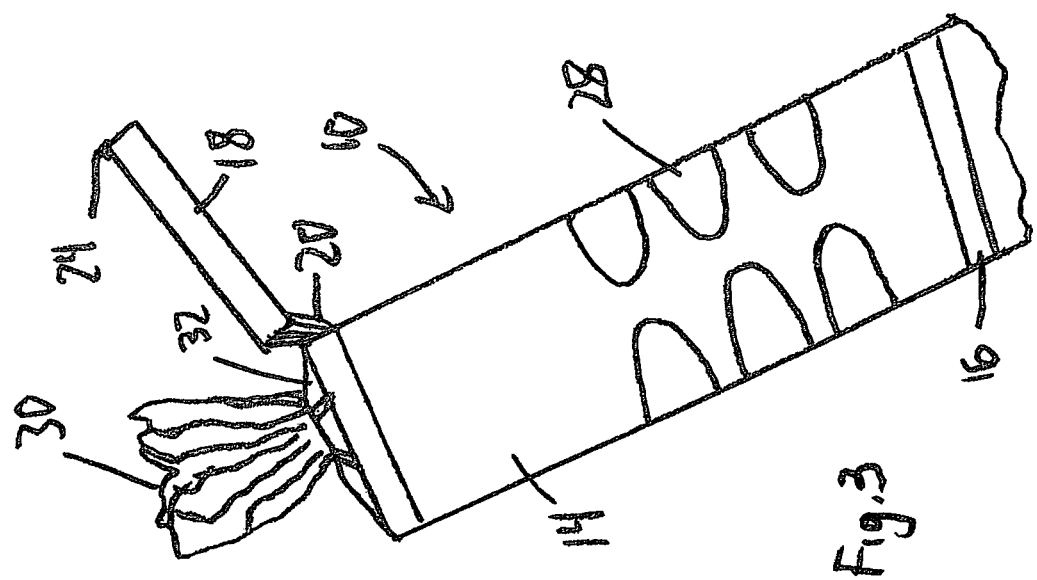
FIG. 3 shows a plan view of one end of the dog walking tube according to the present invention.

BRIEF DESCRIPTION OF THE
EMBODIMENT(S)

Referring to the drawings, there is shown a dog walking tube or cane 10 according to an embodiment of the present invention. The dog walking tube 10 generally may have a cylindrical shape with a predetermined length and predetermined diameter. In one contemplated embodiment a length of approximately twenty four inches is used for the dog walking tube 10. However, it should be noted that any length of tube from five inches to seventy two inches may be used depending on the use of the dog walking tube 10. It should further be noted that any known diameter may be used for the dog walking tube 10. In one contemplated embodiment a diameter of approximately two inches is used, however any diameter ranging from approximately one half inch to approximately four inches may be used for the dog walking tube 10 depending on the use and embodiment in which the dog walking tube 10 may be used.

The dog walking tube 10 generally may consist of a first 12 and second container 14, each arranged on one end of the dog walking tube 10. The first 12 and second container 14 may be separated via an inside wall 16 arranged within the dog walking tube 10. The inside wall or divider 16 may be placed at the mid point or any other predetermined point along the length of the dog walking tube 10. The inside wall 16 may ensure two separate containers 12, 14 are formed within the dog walking tube 10. It is also contemplated to use a plurality of inside walls 16 arranged within the inner bore of the dog walking tube 10. These plurality of inside walls 16 may be arranged at any known points along the length of the dog walking tube 10.

Arranged on one end of the dog walking tube 10 is a first container 12 formed with an open end on one end thereof and the inside wall 16 forming the other end along with the inner bore of the dog walking tube 10. Arranged in a pivotal manner on one end of the first container 12 of the dog walking tube 10 is lid or cover 18. In one contemplated embodiment a hinge of any known type forms a pivotal connection between the lid 18 and the body of the first container 12 of the dog walking tube 10. It should be noted that any known pivot mechanism or hinge may be used to pivotally secure the lid 18 to the body of the first container 12. The lid 18 may rotate from a fully open position to a fully closed position thus creating a secure container on the first end of the dog walking tube 10. The dog walking tube 10 may also include an eyelet or hook 22 arranged on an outside surface of the lid 18. This eyelet or hook 22 may be used to secure a small bottle of hand sanitizer, water or any other apparatus capable of being clipped to the hook or eyelet 22 arranged on the outside surface of the lid 18. The lid 18 is capable of rotating in an arc of approximately 270° about its pivot point. However, any arc between zero and 270° may be used to design the lid 18 of the present invention. The first container 12 has an empty inner bore that may be used to store used fecal matter waste bags used during the walking of the animal or pet. The lid 18 may include a closure mechanism or latch 24 arranged on an outer surface thereof which may interact with an inner wall, inner surface or compatible latch mechanism of the first container 12 of the dog walking tube 10. The latch mechanism 24 may also interact with the outside surface of the dog walking tube 10, the inside surface or another lock or latch mechanism. This may allow for the lid 18 to be securely closed and held against the end of the first container 12 on the dog walking tube 10 to ensure the inside contents placed therein are not spilled or disbursed from the inside of the container 12 via the latch 24 opening on the lid 18.

It is also contemplated in one embodiment to secure a wrist band 26 to an outside surface of the dog walking tube 10 near one end of the dog walking tube 10. However, it is also contemplated to secure the wrist band 26 on the outside surface near both ends of the dog walking tube 10. The wrist band 26 may be secured via an eyelet or hook or any other type of mechanical connecting mechanism or chemical connecting mechanism to the outside surface of the dog walking tube 10. The wrist band 26 may allow for the user of the dog walking tube 10 to ergonomically and easily carry the dog walking tube 10 during the walking of the dog. The dog walking tube 10 may also have arranged on an outside surface thereof a hand grip 28. The hand grip 28 may be arranged on either one end or both ends of the outer surface of a dog walking tube 10 as shown in the figures. The hand grips 28 may be molded or formed directly into the outside surface of the dog walking tube 10 or may be placed onto the outside surface of the dog walking tube 10 after initial manufacture of the dog walking tube 10. The hand grips 26 may be made of the same material as the dog walking tube 10, but also may be made of a different material that has a more ergonomically pleasing feel than the material of which the dog walking tube 10 is made.

Figure 4:
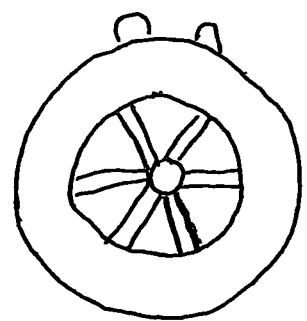
FIG. 4 shows an end view of one end of a dog walking tube according to the present invention.

The dog walking tube 10 also includes on a separate end thereof a second container 14. The second container 14 generally has the same shape as the first container 12 and includes the opposite side of the inside wall 16 of the dog walking tube 10. The second container 14 may also include a lid 18 having a latch 24 on one end thereof, wherein that latch 24 interacts with either a locking mechanism on the second end of the dog walking tube 10, an inside or outside surface of the second end of the dog walking tube 10. The opposite end of the lid 18 includes a hinge 20 which forms a pivotal connection with respect to the second end of the body of the dog walking tube 10. The hinge 20 may be of any known hinge type or any other known hinge that is capable of having a pivotal rotation about a pivot point located on or near an edge of the second container 14. The lid 18 may be capable of rotating within a 270° arc as described above for the lid 18 on the first end of the first container 12. In one contemplated embodiment the second end and second container 14 of the dog walking tube 10 may include a plurality of fecal matter waste bags 30 stored therein. The fecal matter waste bags 30 may be arranged in any known manner allowing for simple, easy, single removal of a fecal matter waste bag 30 when the dog walker has to clean up a mess by the dog it is walking. The connectors 20 that are a part of the hinge 20 for the pivot mechanism on the lid 18 of the second end of the dog walking tube 10 may be molded or added in a separate manufacturing process to an edge of the second end of the dog walking tube 10. The second end may also include a nipple 32 arranged on the outside surface or within the bore of the second end of the dog walking tube 10. This nipple 32 may have a predetermined shaped cutout arranged at a mid point thereof and allow for one fecal matter waste bag 30 to be removed from the second end of the dog walking tube 10 in order to clean up the mess of the dog being walked. The latch 24 at the end of the lid 18 may allow for securing of the lid 18 after removal of a fecal matter waste bag 30, such that the dog walking tube 10 has a clean aesthetic appearance to the public. It should be noted that it is contemplated to have other components or objects be stored within the second end or first end of the dog walking tube 10, not just fecal matter waste bags 30. Anything such as food, money, dog treats, or any other known object or component may be stored within the second end or first end of the dog walking tube 10. It should also be noted that the nipple 32 arranged in the dog walking tube 10 as shown in FIG. 4 may or may not be arranged in the second end of the dog walking tube 10.

The dog walking tube 10 generally is made of a plastic material by a molding or forming process. However, it should be noted that it is also contemplated to make the dog walking tube 10 out of any known metal, ceramic, composite, glass, or natural material. It is also contemplated to use multi materials to create the dog walking tube 10 depending on the use and embodiment in which the dog walking tube 10 may be used. It is also contemplated to put an eyelet or hook 22 on each outside surface of the lids 18 on each ends of the dog walking tube 10 or on none of the outside surfaces of the lids 18 of the dog walking tube 10 depending on the embodiment and design of the dog walking tube 10. It should further be noted that the dog walking tube 10 may also be used as a defensive mechanism to ward off humans if necessary or other animals from the dog walker or the dog being walked. The dog fecal matter waste bag dispenser may also carry saniwipes or tissues, etc., if desired by the dog walker. It should further be noted that the dog walking tube 10 may be made with any known color or design on the outer surface thereof. Therefore, special occasion colors, such as breast cancer awareness, aids awareness, or heart disease, cancer awareness may also be embroidered, painted, or formed onto the outside surface of the dog walking tube 10. It should further be noted that the dog walking tube 10 may be weighted with weights placed at certain portions of the dog walking tube 10 to create an easier to use and more ergonomically weighted dog walking tube 10 for the user.

FIGS. 5 through 7 show an alternate embodiment for a dog walking tube 10 and leash, according to the present invention. Like numerals indicate like parts 111. The dog walking tube or apparatus 110 as shown in FIGS. 5 through 7 has the same tube like shape as the embodiment described above. However, in one contemplated embodiment the diameter of the tube 110 would be larger at one end and smaller at the other end, hence, forming a tapered or cone like body 112. The other components and sizes of the dog walking tube or apparatus 110 are the same or similar to those described above for the embodiment shown in FIGS. 1 through 4. It is further noted that the alternate embodiment in FIGS. 5 through 7 may be made of any known material or any known color such as those described above.

The embodiment as shown in FIGS. 5 through 7 generally includes a leash 111. The leash 111 may be any known leash capable of walking an animal such as a dog. Generally, the leash 111 may have a loop or grip on one end thereof and a clasp or connecting mechanism on the opposite end thereof in order to walk the pet dog. The dog walking tube 110 may be secured to the leash 111 via at least one connector strap 113. The embodiment shown has a first connector strap 113 and a second connector strap 113 arranged over and in contact with an outside surface of the dog walking tube 112. Generally, the connector straps 113 may have a sleeve like shape. The connector straps 113 may have a predetermined width between one half inch to five inches depending on the design of the dog walking tube 110 and leash 111. The connector strap 113 generally includes at least one slit 115 arranged along a surface thereof. In another contemplated embodiment a second slit 115 may be arranged parallel to the first slit 115 and generally arranged at a mid-point or around a mid point of the connector strap 113. The slit 115 may have a length that is approximately equal to or may be a little smaller or larger than the width of the leash 111 on which the dog walking tube 110 may be arranged. In one contemplated embodiment the dog walking leash 111 is passed through the first slit 115 of the connector strap 113 and then through the second slit 115 of the connector strap 113 to ensure the connector strap 113 is secured properly to the leash 111. Next, if needed, a second connector strap 115 may also be used to connect with the leash 111 via a first slit 115 and a second slit 115. In one contemplated embodiment the first and second slits 115 may be between one quarter inch and three inches apart from one another. Once the leash 111 is weaved through the connector straps 113, the connector straps 113 are then arranged over the outside diameter or surface of the dog walking tube 112. It should be noted that the connector straps 113 may be arranged over the tube 112 first and then have the leash 111 arranged through the slits 115. Generally, the diameter of the connector straps 113 would be slightly smaller than, or equal to or slightly larger than the outer diameter of the dog walking tube 113. This may ensure that there is a secure connection between the connector strap 113 and the outer surface of the dog walking tube 112 thus ensuring that the dog walking tube 112 may be secured and not slide along the leash 111 during use thereof. It should be further noted that it is also contemplated to use connector straps 113 that have some type of mechanical connection device arranged thereon such as but not limited to Velcro, buckle, tie strings, etc. However, in one contemplated embodiment the material used to create the connector strap 113 will generally be an elastic or neoprene material that generally has an elasticity built therein thus allowing for a firm press fit or interference fit between the connector strap 113 and the outer surface of the dog walking tube 112. The compression or press fit between the connector straps 113 and the dog walking tube 112, wherein the leash 111 is arranged through slits 115 of the connecting straps 113 may allow for the dog walking tube 110 to be secured and not capable of rotation or sliding in a longitudinal direction along the leash 111 of the present invention. This may allow the dog walking tube 110 to either be secured to a leash 111 or to a hand of a pet walker if no leash 111 is being used. It should be noted that any type of material may be used for the connector strap 113 of the present invention as long as that material is capable of being secured to the outer surface of the dog walking tube 112 via any know mechanical or chemical fastening technique. It should be further noted that any color may be used for the material of the connector straps 113 along with any known color being used for the dog walking tube 110 of the present invention. The ends of the dog walking tube 110 and caps or lids 118 are all generally the same as those described above in the previous embodiment. The dog walking tube 110 may operate in a similar or same manner as that described above. The only major difference may be that dog walking tube 110 uses the methodology of connecting the dog walking tube 112 to the leash 111 as described herein. It should be further noted that any number of connector straps 113 may be used to secure the dog walking tube 110 to the leash 111. In one contemplated embodiment only one connector strap 113 may be needed however, any other number of connector straps 113 may be used depending on the size of the dog walking tube 110 and the leash 111 being used therein. It is also contemplated to have the connector strap 113 with one slit, two slits 115, or a plurality of slits 115 that is greater than two depending on the design of the dog walking tube 110 and the connector straps 113 needed. It is further contemplated to have any known shape for the connector straps 113 to provide for a more aesthetically pleasing dog walking tube 110, connecting straps 113 and leash 111.

The present invention has been described in an illustrative manner. It is to be understood that the terminology, which has been used, is intended to be in the nature of words of description rather than that of limitation.

Many modifications and variations of the present invention are possible in light of the above teachings. Therefore, within the scope of the appended claims, the present invention may be practiced otherwise than is specifically described.

What is claimed is:

1. A dog walking apparatus, said apparatus comprising:
   a body having a cylindrical shape;
   a first circular lid attached to a first end of said body;
   a second circular lid attached to a second end of said body, said second lid having a nipple therein; and
   a divider wall extending from said body at a midpoint of said body to form a first and second container within said body, each container having a same shape and size.

2. The apparatus of claim 1 wherein said first lid pivots with respect to said body.

3. The apparatus of claim 1 further comprising a hand grip formed on an outside surface of said body near one or both ends thereof.

4. The apparatus of claim 1 further comprising a wrist band connected to said body.

5. The apparatus of claim 1 wherein said second end stores at least one waste bag therein.

6. The apparatus of claim 5 wherein said first end receives and stores used said waste bag.

7. The apparatus of claim 1 further comprising a first connector strap arranged on and in contact with an outside surface of said body.

8. The apparatus of claim 7 further comprising a second connector strap arranged on an outside surface of said body.

9. The apparatus of claim 8 wherein said second connector strap having at least one slit therethrough.

10. The apparatus of claim 7 wherein said first connector strap having at least one slit therethrough.

11. A dog walking apparatus for use in walking a pet, said apparatus comprising:
    a leash;
    a cylindrical body secured to said leash;
    a first connector strap arranged over and in contact with an outside surface of said body and in contact with said leash, said first connector strap having a first and second slit therein, said slits having said leash arranged therethrough;
    a first cover connected to a first end of said body;
    a second cover connected to a second end of said body; and
    a divider wall extending from an inside surface of said body.

12. The apparatus of claim 11 wherein said second end stores at least one waste bag therein.

13. The apparatus of claim 12 wherein said first end receives and stores used said waste bag.

14. The apparatus of claim 11 wherein said second cover having a nipple therein.

15. The apparatus of claim 11 wherein said first connector strap having a sleeve like shape with a diameter less than or equal to a diameter of said body.

16. The apparatus of claim 11 further comprising a second connector strap arranged over and in contact with an outside surface of said body and in contact with said leash.

17. The apparatus of claim 16 wherein said second connector strap having a sleeve like shape with a diameter less than or equal to a diameter of said body.

18. The apparatus of claim 17 wherein said second connector strap having a first and second slit parallel to one another, said slits having said leash arranged therethrough.

* * * * *

UNITED STATES PATENT AND TRADEMARK OFFICE
CERTIFICATE OF CORRECTION

| | | |
|---|---|---|
| PATENT NO. | : 8,720,384 B2 | |
| APPLICATION NO. | : 13/680212 | |
| DATED | : May 13, 2014 | |
| INVENTOR(S) | : Mary Yvonne Gee | |

It is certified that error appears in the above-identified patent and that said Letters Patent is hereby corrected as shown below:

On the title page item 71 please delete "Raggio & Dinnin, P.C." as Applicant

In the Specification

Col. 1, Line 4, please delete "file" and replace with --filed--

Col. 1, Line 30, please delete "them" and replace with --then--

Col. 4, Line 15, please insert --a-- after --is--

Signed and Sealed this
Fourteenth Day of October, 2014

Michelle K. Lee
*Deputy Director of the United States Patent and Trademark Office*